6 Sheets—Sheet 1.

P., J. & P. W. SOMMER.

MACHINE FOR MAKING WIRE FENCING.

No. 11,658. Reissued Mar. 29, 1898.

Witnesses;

Chas. H. La Porte.

M. B. Clay

Inventors

Peter Sommer.

John Sommer

Peter W. Sommer by W. V. Tyler Atty.

6 Sheets—Sheet 2.
P., J. & P. W. SOMMER.
MACHINE FOR MAKING WIRE FENCING.
No. 11,658. Reissued Mar. 29, 1898.
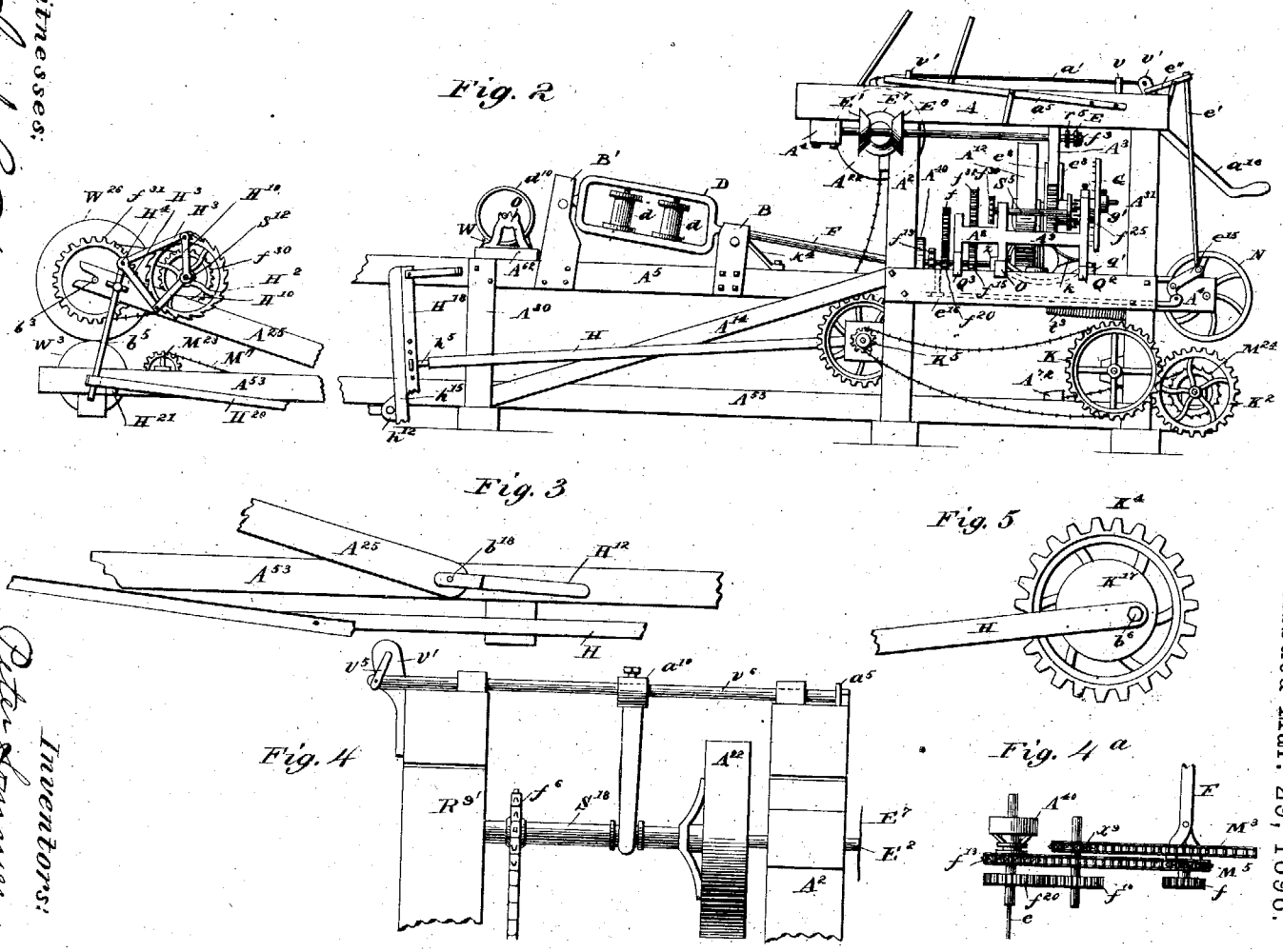
Witnesses:
Chas. H. La Porte.
M. B. May
Inventors:
Peter Sommer
John Sommer
Peter W. Sommer
By W. V. Tefft Att'y.

6 Sheets—Sheet 3.

P., J. & P. W. SOMMER.

MACHINE FOR MAKING WIRE FENCING.

No. 11,658. Reissued Mar. 29, 1898.

Witnesses;

Chas. H. La Porte.

Inventors

Peter Sommer

John Sommer

Peter W. Sommer

By W. V. Tefft Att'y.

P., J. & P. W. SOMMER. 6 Sheets—Sheet 4.

MACHINE FOR MAKING WIRE FENCING.

No. 11,658. Reissued Mar. 29, 1898.

Witnesses;

Chas. H. La Porte

M. B. Riley

Inventors

Peter Sommer

John Sommer

Peter W. Sommer

By W. V. Tefft

Atty.

P., J. & P. W. SOMMER.

MACHINE FOR MAKING WIRE FENCING.

No. 11,658. Reissued Mar. 29, 1898.

Witnesses.

Chas. H. La Porte.

M. B. Mary

Inventors

Peter Sommer

John Sommer

Peter W. Sommer

By W. V. Leffler Atty.

P., J. & P. W. SOMMER. 6 Sheets—Sheet 6.

MACHINE FOR MAKING WIRE FENCING.

No. 11,658. Reissued Mar. 29, 1898.

Witnesses,
J. P. Coleman
W. Edwards

Inventors
Peter Sommer,
John Sommer,
Peter W. Sommer,
By N. H. Blair
Asso. Atty.

UNITED STATES PATENT OFFICE.

PETER SOMMER, JOHN SOMMER, AND PETER W. SOMMER, OF TREMONT, ILLINOIS.

MACHINE FOR MAKING WIRE FENCING.

SPECIFICATION forming part of Reissued Letters Patent No. 11,658, dated March 29, 1898.

Original No. 490,775, dated January 31, 1893. Application for reissue filed April 12, 1894. Serial No. 507,319.

*To all whom it may concern:*

Be it known that we, PETER SOMMER, JOHN SOMMER, and PETER W. SOMMER, citizens of the United States, residing at Tremont, in the county of Tazewell and State of Illinois, have invented certain new and useful Improvements in Machines for Making Wire Fencing; and we do hereby declare that the following is a full, clear, and exact description of the invention, which will enable others skilled in the art to which it appertains to make and use the same.

Our invention relates to certain new and useful improvements in wire-fence-making machines, by means of which a machine is provided being complete and efficient in its working.

More particularly our invention relates to that class of wire-fence-making machines which are purposed to use wire alone in the manufacture of the fence and to produce what is commonly called a "woven-wire"-fence, which consists, essentially, of a series of frame-wires upon which is twisted a continuous wire to form short cables at the intersecting points and at substantially right angles with the frame-wire and weaving it into forms which may be designated as "keystone" meshes and may be operated by any suitable power.

That our invention may be more fully understood reference is had to the accompanying drawings, in which—

Figure 1:
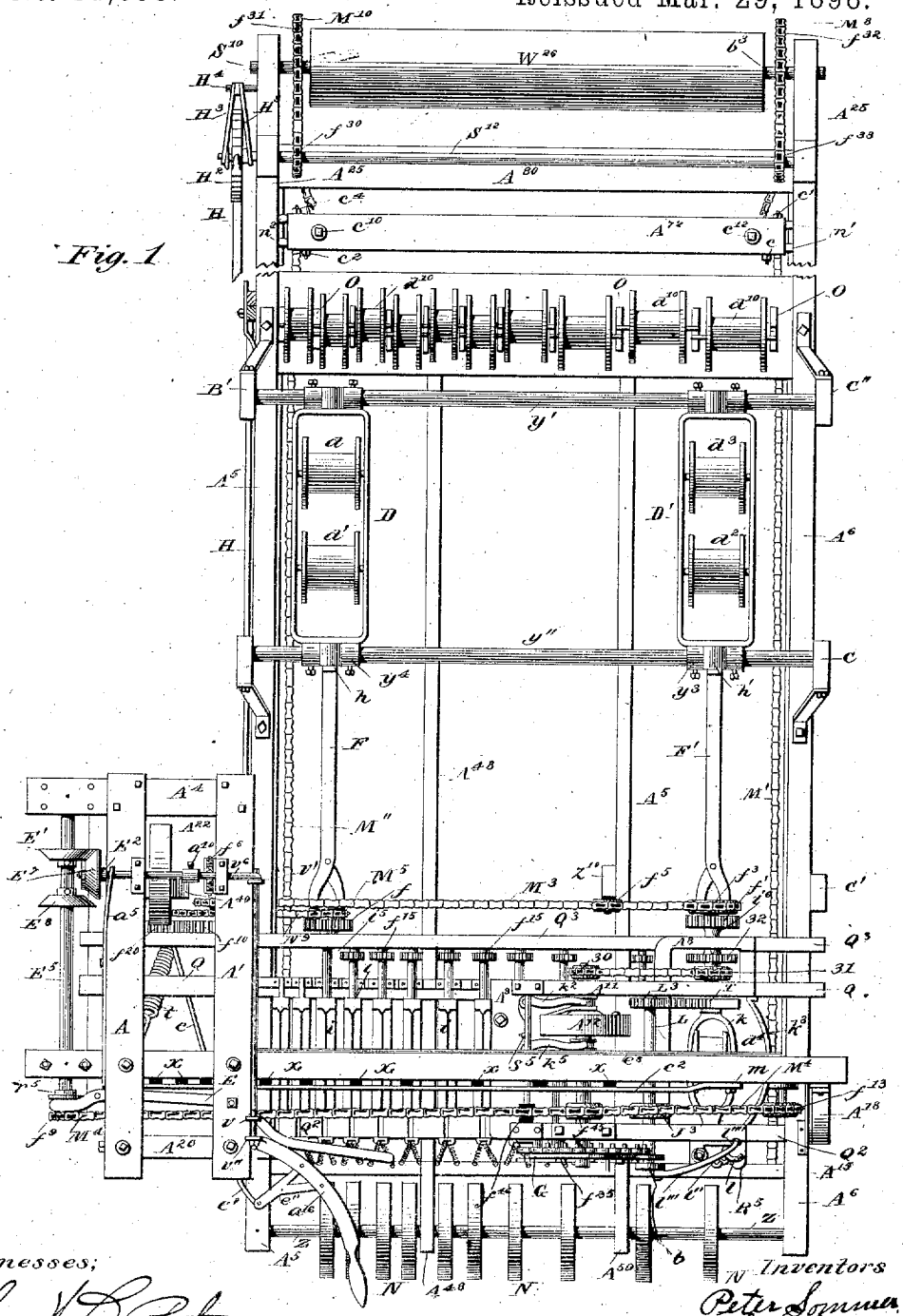
Figure 6:
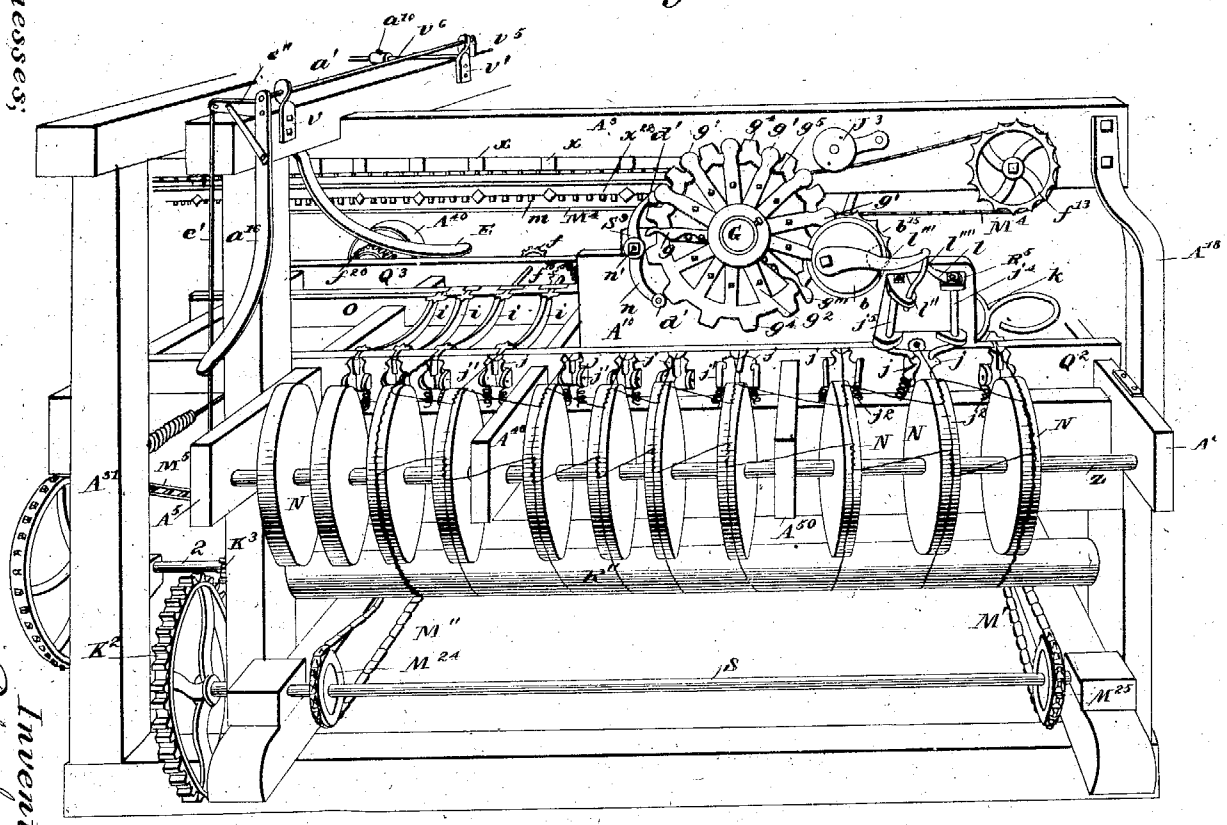
Figure 8:
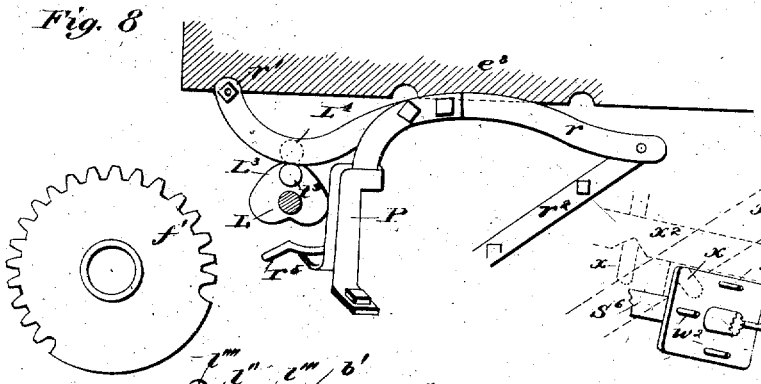
Figure 9:
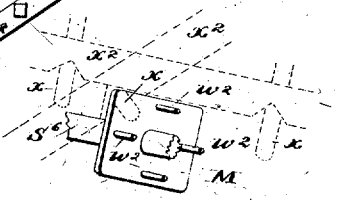
Figure 7:
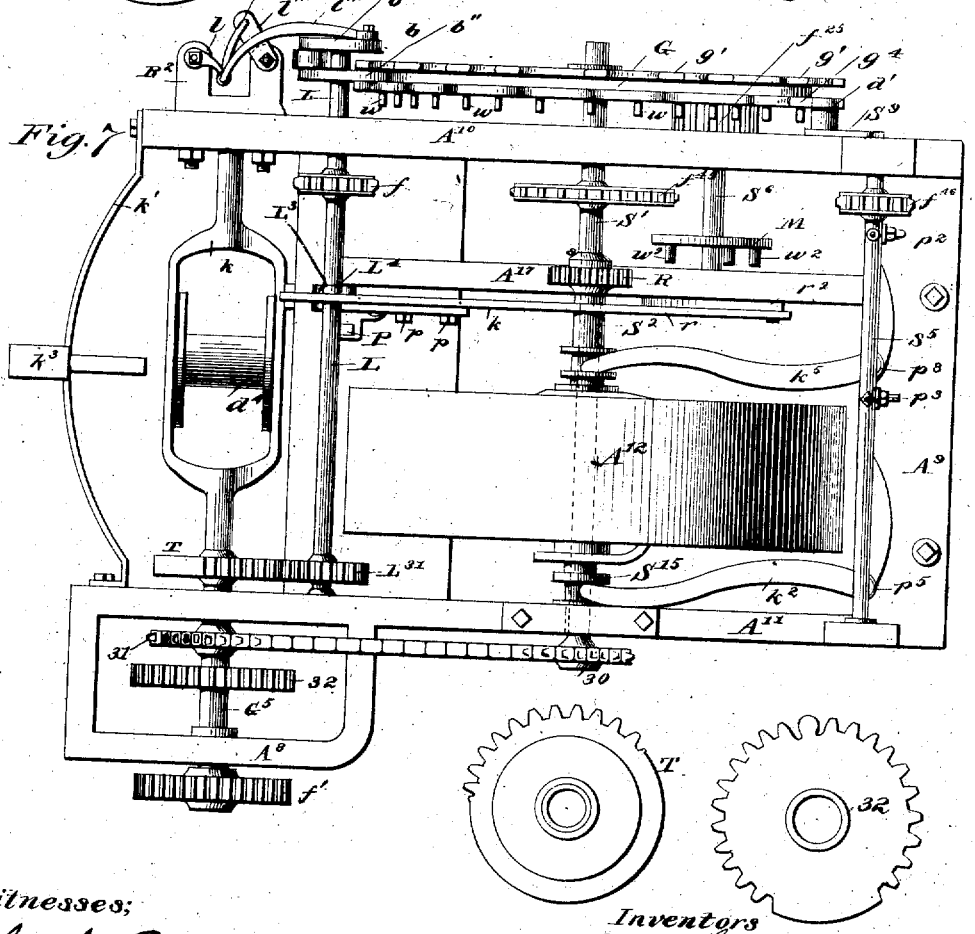
Figure 10:
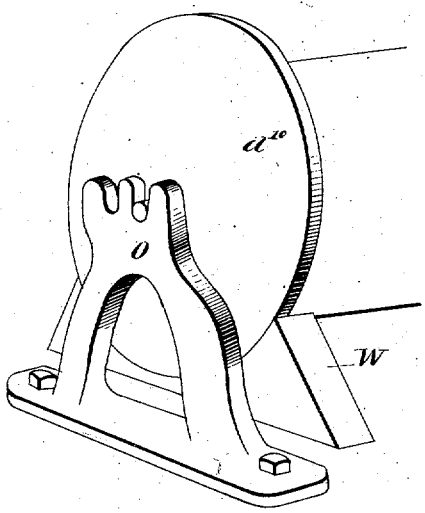
Figure 11:
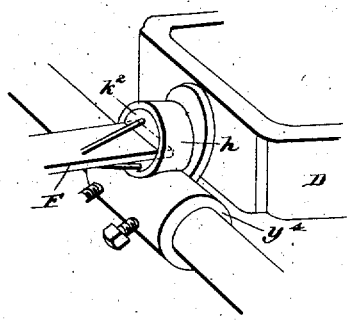
Figure 12:
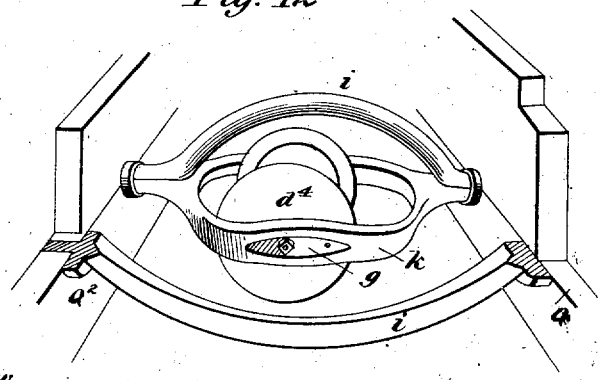
Figure 13:
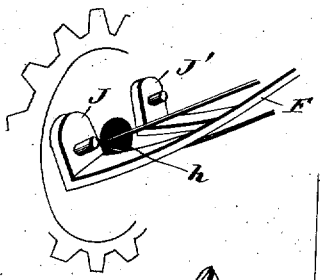
Figure 15:
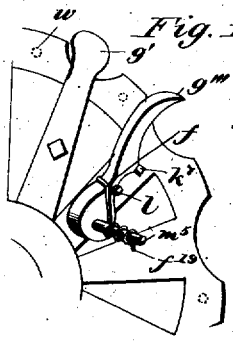
Figure 14:
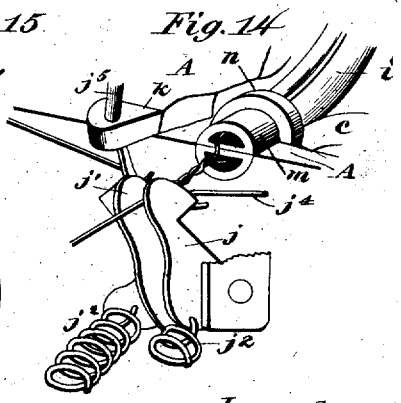
Figure 16:
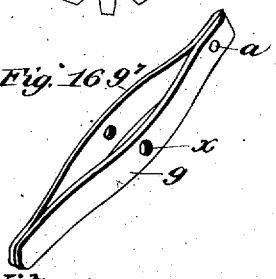
Figure 17:
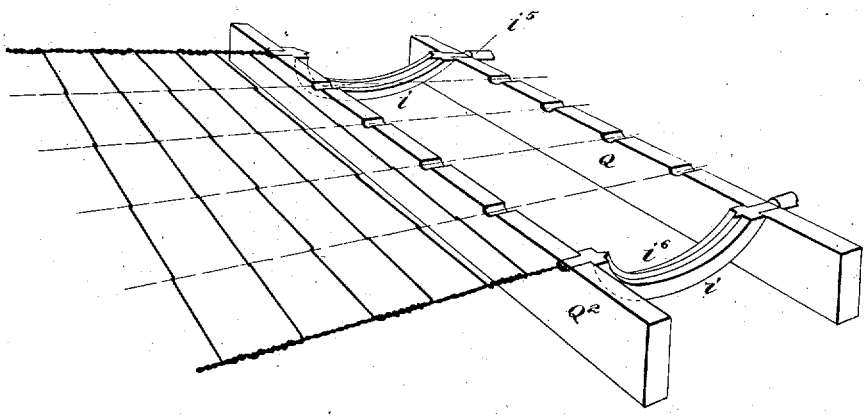
Figure 20:
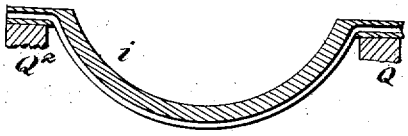
Figure 18:
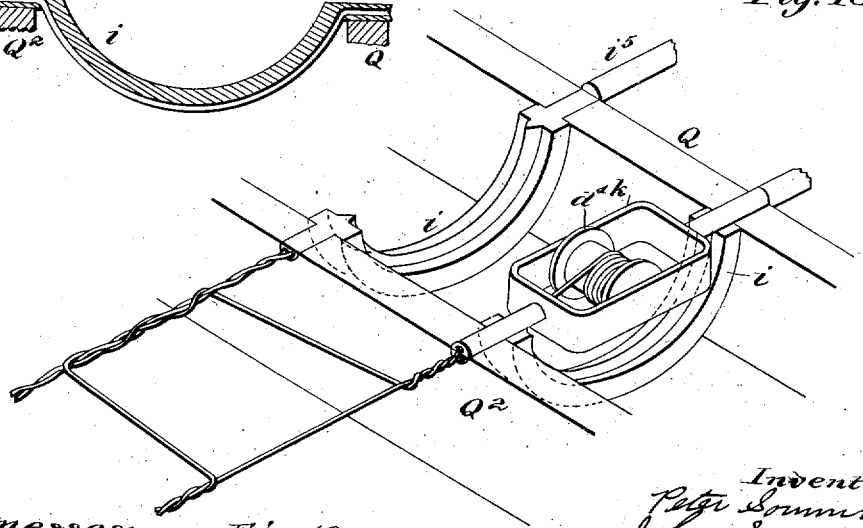
Figure 19:
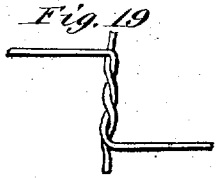

Figure 1 is a plan view of our improved wire-fence-making machine. Fig. 2 is a side elevation of the machine. Fig. 3 is a detail view of a portion of the framework, showing the pivotal attachment of a lever thereto. Fig. 4 is a detail view of a friction-clutch, showing the means of operating the same. Fig. $4^a$ is a detailed view of certain gearing. Fig. 5 is a detailed view of combined sprocket-wheel and eccentric. Fig. 6 is a front elevation in perspective of the machine. Fig. 7 is a detailed view showing a carriage which is designed to bear and travel upon the frame construction. Fig. 8 is a detailed view showing the means of securing the carriage in position, and Fig. 9 is also a detailed view showing an auxiliary means for holding the carriage in a fixed position. Fig. 10 is a detailed view showing the adjustment of spools upon friction-blocks. Fig. 11 is a detailed view showing the means of carrying wires through a spool-frame and also the forward support of the said frame. Fig. 12 is a detailed view showing the combination of two independent sections which are designed to be revolved together. Fig. 13 is a detailed view showing the connection between a sprocket-wheel which is designed to be carried upon the end of a hollow casting and certain bars that connect at the opposite extremity with a frame that carries spools and also shows the manner in which wires are carried to enter the hollow casting. Fig. 14 is a detailed view showing the relative adjustment of operative parts in making a twist of wires. Fig. 15 is a detailed view of a portion of a disk-wheel, showing the location of certain parts. Fig. 16 is a detailed view of a spring to tension the woof-wire spool. Fig. 17 is a perspective showing two of the spindles and their support on a scale larger than that of the other figures. Fig. 18 is a perspective showing one of the outside spindles and one immediately adjacent to it. Fig. 19 is a detail view on an enlarged scale. Fig. 20 is a longitudinal section of one of the twister-sections.

In Fig. 1, $A^5$ and $A^6$ are horizontal side frame-pieces. A, A′, $A^{20}$, $A^3$, and $A^4$ are also portions of the frame construction. $A^2$, $A^{31}$, $A^{18}$, B, B′, C, C′, and C″ are perpendicular frame-pieces, to which the longitudinal frame-pieces are attached. $A^{30}$, $A^{62}$, and $A^{15}$ are cross frame-pieces. Q, $Q^2$, and $Q^3$ are cross-pieces which form a bearing for the carriage, the general framework of which is composed of the parts $A^8$, $A^9$, $A^{10}$, $A^{11}$, $A^{17}$, and $A^{18}$. N N N, &c., are a series of wheels keyed up on the shaft Z, the same being journaled in the frame-pieces $A^5$ and $A^6$, which said wheels are adjusted at different distances apart to aline with the semicircular castings *i i*, &c., the said castings being journaled in open boxes at their forward ends in the frame-piece $Q^2$ and at their backward extremities in open boxes in the frame-piece Q, and are further carried in sockets or boxes in the frame-piece $Q^3$, the said semicircular castings bearing on their backward ends the cog-wheels $f^{15}$ $f^{15}$, &c. The wheels N N, &c., are designed to carry wires upon their surfaces, and the semicircular castings (a detailed view of which is shown in Fig. 12) are provided with a perforation in the half-journals of their forward ends through which wires are carried, as best seen in Fig. 14, the same continuing on beneath the castings and are carried on through perforations or hollow ends of the said castings. Two of the said castings have backward extensions, which are designed to carry the segmental cog-wheels $f\,f'$ keyed thereon, the same being designed to carry double wires which, together with a crossing wire which is designed to be twisted with them, form the cables at the sides of the woven fabric. $M^5$ and $f^3$ are sprocket-wheels connected with the castings designed to carry cable-wires, and F and F′ are bars connected with the sprocket-wheels and branched at their forward ends, as shown in Fig. 13, and connected with said sprocket-wheels by means of pins on said sprocket-wheels carried in perforations in the branched arms J J′ of the said bars. D D′ are frames, in which respective frames are carried the spools $d\,d'$ and $d^2\,d^3$, the said frames D D′ being carried in suitable boxes at their forward and backward ends, which said boxes are carried upon the bars $y'\,y''$. A detailed view of the forward part of the frames is shown in Fig. 11, in which said figure the bar F is shown carried in a slot in the end of the solid journal connected with the frame which carries the spools with perforations in said journal above and below the slot which carries the bar, and it also shows the manner in which the box is carried upon the shaft. $d^{10}\,d^{10}$, &c., are spools carried in the standards O O, &c., the same being best shown in Fig. 10, and which said figure also shows a friction-block W, upon which the rim of the spool bears, a friction-block being provided for each spool throughout the series. $A^{72}$, as shown in Fig. 1, is the upper section of a clamp designed to secure the wire fence after it has been woven and to draw it out, which drawing out is accomplished by means of the sprocket-chains M′ and M″, connected therewith, and by other means hereinafter to be more fully described. $W^{26}$ is a roller carried upon the shaft $b^3$, the same being journaled in the frame-pieces $A^{25}$ $A^{25}$. $S^{12}$ is a shaft journaled in the said side pieces $A^{25}$, carrying the sprocket-wheels $f^{30}$ and $f^{33}$ keyed thereon, which are connected with the sprocket-wheels $f^{31}$ and $f^{32}$ upon the shaft $b^3$ by means of the sprocket-chains $M^9$ and $M^{10}$.

In Fig. 2 the detailed construction of the rear portion of the machine is best shown, in which said figure $W^3$ is a roller journaled in the frame-piece $A^{53}$ and in the corresponding frame-piece on the opposite side, the said frame-pieces being the lower and main longitudinal frame-pieces of the machine. On the end of the shaft $S^{12}$ is keyed a ratchet-wheel $H^2$, and journaled on either side of said ratchet-wheel are short arms $H^{10}$, two on either side of the said ratchet-wheel, which, radiating outward, are pivotally connected with corresponding arms $H^3$ at the outer edge of the ratchet-wheel, there being two on either side and carrying upon the pivotal connections the pawls $H^7$ and $H^8$. The said arms extending backward are all pivoted together with the depending lever $b^5$, as at $H^4$, the same depending through a slot in the backward end of the arm $H^{20}$ and is pivoted to the frame-piece $A^{25}$, as at $b^7$.

In Fig. 1, $E^5$ is a slip-shaft journaled in the frame-pieces $A^3$ $A^4$ and having fixed thereon the sprocket-wheel $f^9$, the collar $r^5$, and the beveled wheels E′ and $E^8$.

$E^2$ is a shaft journaled in perpendicular frame-pieces $A^2$ $R^9$, Fig. 4, and having secured thereto the friction-wheel $E^7$ and the friction clutch-wheel $A^{22}$ and bearing also a hollow shaft to which is attached the sprocket-wheel $f^6$.

$M^4$ is a sprocket-chain running upon and connected with the sprocket-wheels $f^{13}$ $f^9$, (shown in Figs. 1 and 6,) and the said sprocket-chain $M^4$ is carried also upon sprocket-wheels $f^{45}$ $f^{46}$ and the belt-tightener $J^3$. (The operation and use of these various sprocket-wheels will be more fully described in connection with the description of Fig. 7.)

E is a lever pivoted to the under side of the frame-piece A′ and is provided at its outward end with suitable fingers, which are carried between the rims of the collar $r^5$, and the object of the said lever and its use is to operate the shifting shaft $E^5$ by a backward or forward movement with a view of alternately contacting the beveled wheels E′ $E^8$ with the beveled friction-wheel $E^7$, which produces an alternate direction of rotation of the shaft $E^5$ as is necessary to run the sprocket-chain $M^4$ alternately in opposite directions.

$a^{16}$ is a lever to which is attached the rod $a'$, the same being journaled in suitable boxes and provided at its backward end with the short depending arm $V^5$, (best shown in Fig. 4,) which connects with the shift-rod $v^6$, which said shift-rod is attached to the spring $a^5$ at its outer end and which carries fixed thereon the depending arm $a^{10}$, which connects by means of fingers with a collar on the hollow shaft $S^{18}$, which bears the sprocket-wheel $f^6$ and clutch attachment, the combination being designed to operate the friction clutch-wheel $A^{22}$.

To the lever $a^{16}$ is attached the projecting arm $e''$, the same connecting with the depending rod $e'$, as will be best seen by reference to Fig. 2, and in this figure the depending rod $e'$ is pivotally connected with the pivoted lever $e^{15}$, and to the short arm of the lever $e^{15}$ is pivotally connected the rod $e$. The same, bearing backward, carries fixed thereto the arm $e^{16}$, which is connected by means of fingers with the collar on a hollow shaft which bears the sprocket-wheel $f^{13}$ and clutch attachment, Fig. 4[a], and is designed to engage or release the friction clutch-wheel $A^{40}$.

$t^3$ is a spring attached to the rod $e$ and designed to release the friction-clutch when not desired to be operated, and the other combination just described is designed to operate the said friction-clutch for engagement with wheel $A^{40}$.

K $K^5$ are sprocket-wheels connected by means of a sprocket-chain, and upon the same shaft with the sprocket-wheel K (the said shaft being designated in Fig. 6 by 2) is the cog-wheel $K^3$, which meshes with the cog-wheel $K^2$, the same being upon the shaft S, which also carries the sprocket-wheels $M^{25}$ and $M^{24}$, keyed thereon, the said sprocket-wheels $M^{24}$ and $M^{25}$ carrying the sprocket-chains M′ and M″, which are carried upon the sprocket-wheels at the rear end of the machine, one of which is designated by $M^{28}$, as shown in Fig. 2.

In Fig. 2 the sprocket-wheel $K^4$ is journaled upon the same shaft with the sprocket-wheel $K^5$, the said sprocket-wheel $K^4$ being provided with a pin at a point without its center to form an eccentric, to which is attached the backwardly-extending arm H, the said arm being connected with the spring-lever $H^8$, which is pivoted to the frame-piece $A^5$, and which said spring-lever is completed by means of the depending arm $h^{15}$, to the lower portion of which is attached the extension-arm $H^{20}$, the same bearing upon the lug $H^{21}$, and is provided with a perforation through which the depending lever $b^5$ bears loosely. The sprocket-wheel $K^4$ is connected with the sprocket-wheel $f^6$, as shown in Figs. 1, 2, and 4, by means of a sprocket-chain.

$f^{10}$ and $f^{20}$ are cog-wheels designed to mesh with each other, as shown in Fig. 4ª, the cog-wheel $f^{20}$ being keyed upon the same shaft with the wheel $A^{40}$ and the cog-wheel $f^{10}$ being keyed upon the same shaft with the sprocket-wheel $x^2$.

$N^9$ is a sprocket-chain connecting the sprocket-wheel $M^5$ with the sprocket-wheel $f^{13}$. (Shown in Fig. 2.)

$M^8$ is a sprocket-chain connecting the sprocket-wheel $x^9$ with the sprocket-wheel $f^8$.

$f^5$ is a sprocket-wheel designed as a support for the sprocket-chain $M^8$.

In Fig. 6, R″ is a roller upon which the wire-netting bears and is designed only to give direction to and facilitate the drawing out of the wire fabric. To the frame-piece $A^3$ are attached the depending fingers $x$ $x$, &c., and bearing over these depending fingers is the notched bar $x^2$, and on the lower surface of said frame-piece $A^3$ is fixed the plate of cogs $m$. $j$ $j$, &c., are a series of fingers pivoted together in pairs in the castings J′ and alining with the wheels N N, &c., and with the semicircular castings $i$ $i$, &c., and having attached thereto the springs $j^2$ $j^2$, &c.

In Fig. 7 we have a detailed view of a movable framework or carriage which is designed to bear and travel upon the frame-pieces Q′, $Q^2$, and $Q^3$ and is composed of the main frame parts $A^8$, $A^9$, $A^{10}$, $A^{11}$, $A^{17}$, and $A^{18}$, and within the frame-pieces $A^{10}$ and $A^{11}$ we have journaled the main shaft S′, upon which is loosely journaled the disk-wheel G and having keyed thereon the sprocket-wheel $f^{45}$. Upon the said shaft S′ is the hollow shaft $S^2$, upon which said hollow shaft is fixed the cog-wheel R. $A^{12}$ is a friction clutch-wheel, the same being keyed upon the shaft S′. The said hollow shaft $S^2$ is provided with a suitable collar and clutch apparatus to engage the rim of the wheel $A^{12}$, as is also the hollow shaft $S^{15}$, which said shaft $S^{15}$ carries at its rear extremity the sprocket-wheel $f^{30}$, fixed thereto. $k^2$ $k^5$ are levers, being pivoted, as at $p^5$ $p^8$, with the long arms thereof connecting by suitable fingers with the collars on the hollow shafts $S^2$ $S^{15}$, and the short arms of the said levers, bearing slightly upward, are fixed to the shaft $S^5$, as at $p^2$ $p^3$, and are designed to shift the friction-clutches to engage or release the friction-clutch wheel $A^{12}$, which is accomplished by a slight turn of the shaft $S^5$, which will be more fully described in connection with the operation of the machine. $f^{46}$ is a sprocket-wheel loose upon the shaft $S^5$, upon the forward end of which said shaft $S^5$ are attached rigidly the fingers $S^9$, the same being best shown in connection with Fig. 6, in which said figure the fingers are shown fixed, as at $n'$, and bearing at their outward extremities the small pivoted rollers $d'$. $S^6$ is a shaft, journaled in the frame-pieces $A^{10}$ $A^{17}$, upon the forward end of which is keyed the cog-wheel $f^{25}$, and also having fixed thereon the square plate M, being provided with pins, as best shown in Fig. 9, in which said figure $S^6$ is the shaft, M the square plate, and $w^2$ $w^2$ $w^2$ are pins fixed upon the square plate, as shown in Fig. 9, the slightly-rounded corners of said square plate being designed to fit within a notch or notches of the bar $x^2$, and the depending finger $x$ is designed to contact with the pins $w^2$ $w^2$ $w^2$, &c., for the purpose of turning the square plate M, which will be more fully described in connection with the operation of the machine. L is a shaft journaled in the frame-pieces $A^{10}$ and $A^{11}$ and having keyed thereto the segmental cog-wheel $L^{31}$, a detailed detached view of which is shown below Fig. 7 and designated by the letter T, and to which said shaft L is also attached the cam-wheel $L^3$, a detailed view of which is shown in Fig. 8, in connection with which is shown a device which it operates for the purpose of staying the carriage in the desired position. The device for staying the carriage consists, essentially, of a pivoted lever $r$, branched at its forward end into two arms, one arm bearing upward and carrying a roller at its upward extremity which is designed to engage the openings or depressions in the plate $e^8$, the said upward-extending arm being also provided with the pivoted roller $L^4$, which contacts with the cam-wheel $L^3$, which said cam-wheel in its rotation raises the lever to the desired height. The depending arm $r^5$ of the lever $r$ is purposed to contact with the small roller $t^9$ on the cam-wheel in the rotation of the said wheel, which is pur posed by such contact to depress the said lever and with it the upwardly-tending arm of the lever, thus releasing it from the engagement with the depressions in the plate $e^3$. P represents a standard fixed upon the framework of the carriage and purposed to hold the lever in proper position. $r^2$ is a bar designed to be attached to the framework of the carriage and to which is pivotally attached the lever $r$. Upon the shaft L is loosely journaled the sprocket-wheel $f$, and upon the forward end of the said shaft are fixed the disk-wheels $b$ and $b''$, between which said disk-wheels and at their outward edge is carried the pivoted roller $b'$, which is purposed to engage the fingers $g'$ $g'$, &c. The inner disk-wheel $b''$ is purposed to engage slight depressions in the disk-wheel G, the said disk-wheel $b''$ being cut off or depressed at or near the point where the roller $b'$ contacts with the said disk to enable it to free itself from its engagement in the depressions before described in the disk-wheel G. $G^5$ is a shaft journaled in the frame-pieces $A^8$ $A^{11}$, having keyed thereon the segmental cog-wheel $f'$, a detailed detached view of which is shown above Fig. 7; also, the segmental cog-wheel 32, a detailed view of which is shown below Fig. 7; also, the sprocket-wheel 31, the same being connected with the sprocket-wheel 30 by means of a sprocket-chain, and said shaft $G^5$ also has fixed thereon the segmental cog-wheel T, exactly similar to the segmental cog-wheel $L^{31}$, with which it engages. The purpose of the said cog-wheels and sprocket-wheels will be more fully shown in connection with the description of the operation of the machine. $k$ is a framework which carries the spool $d^4$ and having the forward ends journaled in semicircular depressions in the lower surface of the frame-pieces $A^{10}$ and $A^{11}$, which conform with the shape of the journal which it carries, the detailed construction of which is best shown in Figs. 12 and 14. To the front face of the frame-piece $A^{10}$ is attached the casting $R^5$, which has forwardly-projecting lugs, as best shown in Fig. 6, which carry through perforations depending pins $j^4$ $j^5$, which carry at their lower extremities short arms, which are purposed to engage and press outward the fingers $j$, as best shown in Fig. 14, and the said short arms are operated through and by means of the levers $l$ $l''''$ $l''$ and the connection $l'''$ with the disk-wheel $b$ at a point without its center, which forms an eccentric, the operation of which will be hereinafter more fully described. $k'$ is an iron frame-piece, to which is attached the spring $k^3$, which acts as a straightener or adjuster for the semicircular castings to keep them in proper position that they may not interfere with the movement of the carriage in its passage back and forth.

In Fig. 12 is shown the detailed construction of the semicircular casting $i$ and also its combination with the framework which carries the spool. In this figure the casting $i$ is shown with its half-journals bearing in semicircular depressions in the lower framework, so that the flat surface of the half-journals of the casting $i$ is flush with the upper surface of the frame-piece in which it bears. The framework which carries the spool is also provided with a half-journal which is carried in the framework of the carriage, so that the carriage in its passage backward and forward stops immediately over the casting $i$, as it is arranged so as to stop over every casting of the series to form a complete journal, and it is designed that they be rotated when in this position in the manner shown in the said figure, and the appearance of the complete journal thus formed is best shown in Fig. 14, which also shows openings in each half-journal for the passage through of wires which are designed to be twisted together. By making these castings or spindles of a semicircular form they are bowed or deflected away from the line of the wire-passage through the journals and provide a similarly bowed or deflected wire-guide; and as results, first, a desirable tension on the wire is attained, it being retarded against free passage through the twister, and, secondly, large open spaces are provided at or near the axes of rotation, in which can be supported a large quantity of mesh or weft wire.

In Fig. 16 is shown a spring which is designed to be carried in the framework which bears the spool, as shown in Fig. 12, and is designated by $g$ and is designed to contact with the spool to prevent its turning too freely, thus producing a tension of the wire being wound from the spool, and this may be regulated by means of a bolt-and-nut connection between the spring and spool.

In Fig. 6 G refers to a disk-wheel made in several sections to form the notches and raised portions $g^4$ $g^4$, &c., and the circular depressions $g^5$ $g^5$, &c., and provided with the fingers $g'$ $g'$, &c., and the pins $w$, &c., as shown in Fig. 7, and also provided with the pivoted fingers $g'''$ $g'''$. (Best shown in detail in Fig. 15, in which said figure the pivoted finger $g'''$ is shown journaled on the pin $m^5$ and held down upon the lug $k$ by means of the spring $f^{19}$.) The use and purpose of the several parts of the disk-wheel G will be hereinafter more fully described in connection with the operation of the machine.

In operation the several parts of the machine having been first adjusted in their relative working positions power is applied through and by means of a belt connection with the wheel $A^{22}$, which in its rotation rotates the shaft $E^2$, which in turn rotates the beveled friction pulley-wheel $E^7$, which, as shown in Fig. 1, contacting with the bevel-wheel E', rotates the same and with it the shaft $E^5$, (it will be understood that by contact of $E^7$ with $E^8$ the opposite rotation of shaft $E^5$ is had,) upon which it is fixed, which imparts a corresponding rotary motion to the sprocket-wheel $f^9$, which in turn imparts movement to the sprocket-chain $M^1$, the said sprocket-chain engaging the sprocket-wheel $f^{45}$ and being held firmly upon the said sprocket-wheel by means of the loosely-journaled sprocket-wheels $f$ and $f^{46}$ rotates the same and with it the shaft S′, upon which it is secured. As the wheel $A^{12}$ is also secured to the shaft S′, it is likewise rotated, and, as before described, it is designed to be engaged and released by the friction-clutches alternately and at all times by one or the other of the said friction-clutches to impart rotary motion to the hollow shafts $S^3$ and $S^{15}$, upon which is secured upon the hollow shaft $S^2$ the cog-wheel R, which is designed to move the carriage, and upon the hollow shaft $S^{15}$ the sprocket-wheel 30, which by means of its sprocket-chain connection with other working parts of the machine is designed to convey the requisite rotary motion to form the several twists. The shifting of the friction-clutches is accomplished by means of the arms $k^5$ and $k^2$, which form the long arms of a lever, the same being pivoted, as at $p^8$ and $p^3$, respectively, the long arms being provided with fingers at their forward extremities purposed to engage with and being carried in suitable collars on the hollow shafts $S^2$ and $S^{15}$, and the short arms of the said levers bearing forward and upward are secured to the shaft $S^5$, as at $p^2$ $p^3$, which said shaft bears at its forward end the semicircular piece $S^9$, (best shown in Fig. 6,) which, being secured at its central portion to the said shaft $S^5$ and bearing at its opposite extremities the small rollers $d'$ $d'$, is designed to shift the shaft $S^5$ in opposite directions through and by means of the small rollers contacting with the raisers $g^4$ $g^4$, &c., and intermediate depressions in the disk-wheel G when the said disk-wheel is rotated, the manner of the said rotation to be more particularly described. As before described, the sprocket-wheel 30, rotating by means of a sprocket-chain connection, rotates the sprocket-wheel 31 and with it the shaft $G^5$, upon which are keyed the segmental cog-wheels 32 and T. Attention is called to the two segmental cog-wheels immediately below Fig. 7. The cog-wheel 32 is designed to mesh with the cog-wheels $f^{15}$ on the rearward ends of the castings $i$ $i$, &c. The segmental cog-wheel T is designed to mesh with the segmental cog-wheel $L^{31}$, which, being keyed upon the shaft L, rotates the same, which in turn rotates the cam-wheel $L^3$ and also the disk-wheels $b$ $b''$ on the forward end of the said shaft. The machine in operation in the position shown in Fig. 7, the segmental cog-wheel T, rotating to the left, has traversed its cogs, imparting a motion through the cog-wheel $L^{31}$ and to the shaft L, throwing the cam-wheel $L^3$ into position shown in Fig. 8, which bears upward the lever $r$, and a roller on the end thereof is engaged in the semicircular depression in the plate $e^8$ to stay the carriage in position, and the same action of the said shaft L throws the arm $l'''$ into the position shown in the said figure, which throws outward the short arms $l$ $l''$ and with them the short arms on the depending rods $j^4$ $j^5$, which are designed to draw a wire forward and also contacting with the fingers $j$ $j$, &c., throw them outward. The machine continuing its operation the segmental cog wheel 32, meshing with the cog-wheel $f^{15}$ on the backward end of one of the castings $i$, which, as before explained, completes the journal-bearing in connection with the framework that carries the spool, rotates the same, turning with it the framework $k$, which carries the spool $d^4$, thus making the twist, as shown in Fig. 14, one revolution of the segmental cog-wheel 32 imparting two revolutions to the twisting device, and when the cog-wheel T has completed its rotation over its smooth surface and again engaging with its cogs the cog-wheel $L^{31}$ gives a half-turn to the shaft L, which in turn throws the cam-wheel $L^3$ downward, when the roller $t^9$ contacts with the arm $r^5$ of the lever $r$, depressing the said lever and releasing the roller $r'$ from its engagement with the semicircular depression in the plate $e^8$ and also throwing the disk-wheels $b$ $b''$ into the reverse position here shown and bringing the small roller $b'$ in contact with one of the fingers $g'$, thus imparting motion to the disk-wheel G, and by means of the pins $w$ $w$, &c., on the disk-wheel G engaging the cogs of the cog-wheel $f^{25}$ imparting a slight motion to said cog-wheel, which in turn turns the shaft $S^6$, which bears with it the square plate M, which shifts the said plate from its position shown in Fig. 9 to the position shown in dotted lines, in which position its lineal sides are parallel with the plate $x^2$, and the movement of the disk-wheel G and the contact of the small roller on $S^9$ with the raised portion $g^4$ throws the piece $S^9$ from its position shown in Fig. 6 (in which position, as there shown, operates the levers of the friction-clutch so as to engage the wheel $A^{12}$, so as to rotate the said shaft $S^{15}$, which operates the machine, as hereinbefore described, to form the twist) into the reverse position—that is, with the upper roller in an intermediate depression—in which said position the shaft $S^5$ is shifted with the piece $S^9$, and with it the levers $k^5$ $k^2$, so that the friction-clutch which connects with the shaft $S^{15}$ is released from the wheel $A^{12}$, and the wheel $A^{12}$ is in turn engaged by the friction-clutch connected with the shaft $S^2$. The shaft S′, being in rotation by its sprocket-wheel connection $f^{45}$ with the chain $M^4$, rotates the wheel $A^{12}$, and by the action of the friction-clutch just before described the shaft $S^2$ is rotated and with it the cog-wheel R, which said cog-wheel R, meshing with the plate of cogs $m$, bears the carriage forward until one of the depending fingers contacts with one of the pins $w^2$, when the square plate M, Fig. 9, is turned to engage the notch in the plate $x^2$, which slight turn also turns the cog-wheel $f^{25}$, which, contacting with one of the pins $w$ on disk-wheel G, gives a slight turn to the disk-wheel G, and in this turn the piece $S^9$ is again shifted into the position, as shown in Fig. 6, which in turn shifts the friction-clutches, so as to release the hollow shafts S $S^2$, when the carriage immediately stops it, having traveled the space between one of the castings $i$ and the next succeeding casting, and is stopped at such a point as to bring the half-journals of the framework $k$, which carries the spool $d$, so as to form a complete journal with the half-journal immediately below in readiness for the twist. It will be understood that the wheels N N, &c., the castings $i$ $i$, &c., and the spools $d^{10}$ $d^{10}$, &c., aline, and the said spools $d^{10}$ are designed to carry wires which, bearing forward, are carried through perforations in the castings $i$ $i$, &c., and upon the surfaces of the wheels N N, &c., which constitute the intermediate frame-wires of the wire fabric. A continuous or crossing wire, which is designed to be twisted upon the frame-wires, is carried upon the spool $d^4$ and is carried forward through a perforation in the forward part of the half-journal of the framework $k$, as seen in Fig. 4. The frame-portions D D′ carry the spools $d$, $d'$, $d^2$, and $d^3$, which are purposed to carry wires which bear forward through perforations in the journal, one of which is designated by $k^2$, as shown in Fig. 11. The wires, continuing forward, one on either side of the respective bars F F′, pass through openings in the castings $i^5$ $i^6$, and continuing on through the castings are finally carried upon the wheels N N and are twisted to form a cable, upon which said cables is also twisted at intervals the continuous wire. The manner of turning the cables will be seen by reference to Fig. 1, where it will be understood that the cog-wheel $f'$ meshing with a cog-wheel on the end of a similar casting to $i^5$ and corresponding in relative adjustment with cog-wheel $f$ and being rotated with the twister twists the cable, and the sprocket-wheel $f^3$ being fixed upon the same shaft operates the sprocket-chain $M^3$, and the sprocket-chain being connected with the sprocket-wheel $x^9$ turns the same and with it the cog-wheel $f^{10}$, they being on the same shaft, and the said cog-wheel $f^{10}$, meshing with the cog-wheel $f^{20}$, rotates the same and in its rotation operates the sprocket-wheel $f^{13}$ (best seen in Fig. $4^a$) through and by means of a friction-clutch, to which the said sprocket-wheel is fixed, the same being on a hollow shaft which incloses the shaft on which the cog-wheel $f^{20}$ is fixed. This engagement of the friction-wheel $A^{40}$ by the friction-clutch to operate the sprocket-wheel $f^{13}$ is accomplished through and by means of the lever $a^{16}$ being depressed, which imparts downward movement to the depending rod $e'$, which operates the pivoted lever $e^{15}$, which in turn gives a backward movement to the rod $e$ upon the backward end of which is attached the short arm $e^{16}$, which operates the friction-clutch, and, as before described, when the friction-wheel $A^{40}$ is so engaged the sprocket-wheel $f^{13}$ is rotated and the same being connected with the sprocket-wheel $M^5$ by means of the sprocket-chain $N^9$, and in its rotation the casting $i^5$ is also rotated to make the cable-twist. The bars F F′ and the frames D D′ are turned with the operating-twister to prevent the wires from being twisted. When the carriage is in the reverse position, with the cog-wheel $f'$ meshing with the cog-wheel $f$, the operation is the same, only that the motion is conveyed the reverse from that in the position as shown in Fig. 1. Of course it will be understood that when the continuous or crossing wire is being twisted upon the cable at the respective sides of the fabric the friction-wheel $A^{40}$ is released and only one of the cog-wheels or frames D or D′, as the case may be, is operated in connection with the twister formed by the combination of any one of the castings $i$, &c., or with casting $i$, having extensions $i^5$ with casting $k$, which carries spool $d^4$. After the carriage has traversed the width of the wire fabric and has performed the several twists uniting the continuous wires with the frame-wires it is necessary that the frame-wires be drawn out and wound off from their several spools, the same being accomplished through and by means of the lever $a^{16}$, the same operating the rod $a'$, which has the short depending arm $v^5$, as shown in Fig. 6, to which is attached the rod $v^6$, carried in suitable boxes and being connected with the spring $a^5$, which rod $v^6$ is designed to shift lengthwise, and having fixed thereto the arm $a^{10}$, (best shown in Fig. 4,) depending to connect with the hollow shaft $S^{18}$ upon the shaft $E^2$, which shaft $E^2$ carries the combined friction and belt wheel $A^{22}$, the said hollow shaft being provided with a friction-clutch designed to engage and release, as desired, the wheel $A^{22}$. The said hollow shaft has also fixed thereto the sprocket-wheel $f^6$, which said sprocket-wheel is connected with the sprocket-wheel $K^4$. Upon the same shaft with the sprocket-wheel $K^4$ is the sprocket-wheel $K^5$, the same being connected with the sprocket-wheel K by means of a sprocket-chain, and upon the same shaft 2 with the sprocket-wheel K is fixed the cog-wheel $K^3$, as shown in Fig. 6, which meshes with the cog-wheel $K^2$, the same being upon the end of the shaft S, upon which said shaft are also fixed the sprocket-wheels $M^{24}$ $M^{25}$, which carry the sprocket-chains M′ M″, which extend backward to the back part of the machine and are carried upon sprocket-wheels, one of which is designated by $M^{23}$, the upper strands of said sprocket-chains being connected with the clamp $A^{72}$, which said clamp is designed to secure the wire fabric and draw it backward through the operation of the machine from its position in Fig. 2 to its position shown in Fig. 1. When it is desired to draw the wires from off the spools to provide the proper space for a mesh in the wire fabric, the lever $a^{16}$ is operated to engage the friction-clutch on the hollow shaft $S^{18}$, Fig. 4, with the wheel $A^{22}$, which said wheel $A^{22}$, being rotated through and by means of the bolt $p$, gives a corresponding rotary motion to the sprocket-wheel $f^6$, which is conveyed to the sprocket-wheel $K^4$ by means of the sprocket-chain connection, which said rotary motion is thus conveyed to the sprocket-wheel $K^5$ and again conveyed to the sprocket-wheel K by means of a sprocket-chain. The said sprocket-wheel K, being fixed upon the same shaft with the cog-wheel $K^3$, rotates the shaft, which imparts a rotary motion to the said cog-wheel. The same, meshing with the cog-wheel $K^2$, turns the same, and with it the shaft S, which in turn rotates the sprocket-wheels $M^{24}$ $M^{25}$, fixed thereon, thus operating the sprocket-chains to which the clamp $A^{72}$ is attached, which secures the wire fabric, thus completing the operation of drawing out the wires. When they have been drawn out a sufficient distance, the lever $a^{16}$ is released, and by action of the spring $a^5$ upon the shift-rod $v^6$ the friction-clutch is released from its engagement with the wheel $a^{22}$, and the operation of drawing out at once ceases. While the operation of drawing out is being performed, there is a simultaneous movement of the roller $W^{26}$, upon which the wire fabric is rolled, which said movement is conveyed to the roller through and by means of the arm H, Fig. 2, being pivoted at its forward end to the sprocket-wheel $K^4$ at a point $b^6$ without its center to form an eccentric, as shown in Fig. 5, the said arm H being connected at its rear end with the spring-lever $H^{18}$, pivoted at the top and made in two sections with one of the sections connected with the arm $H^{20}$, as at $h^{12}$, and carried upon the lug $H^{21}$ and provided with a perpendicular slot in its backward extremity, through which the lever $b^5$ depends loosely, the said lever $b^5$ being pivoted, as at $b^7$, and pivotally connected at its upper extremity with the arms $H^3$ $H^8$, which have corresponding arms, Fig. 1, on the opposite side of the ratchet-wheel $H^2$, to which said arms are pivotally connected the arms $H^{10}$, which are journaled loosely upon the same shaft with the ratchet-wheel $H^2$, there being corresponding arms on the opposite side of the ratchet-wheel $H^2$, (one of which is shown,) pivoted and journaled in the same manner as the arms $H^{10}$. Upon the pivotal connecting means are carried the pawls $H^6$ $H^7$, which are designed to engage the ratchets on the ratchet-wheels $H^2$. Upon the same shaft with the ratchet-wheels $H^2$ are the sprocket-wheels $f^{30}$ $f^{33}$, which said sprocket-wheels are connected with the sprocket-wheels $f^{31}$ $f^{32}$ by means of sprocket-chains. The said sprocket-wheels $f^{31}$ $f^{32}$, being fixed upon the same shaft with the roller $W^{26}$, are designed to rotate the said roller. When the wire is being drawn out, as before described, and the sprocket-wheel $K^4$ is being rotated, it will be seen that a backward and forward movement will be imparted to the arm H, since the said arm is pivoted to the said sprocket-wheel to form the eccentric, as shown in Fig. 5. The said backward and forward movement of the arm H is conveyed to the spring-lever $H^{18}$ and thence to the arm $H^{20}$, which imparts a backward and forward movement to the depending lever $b^5$, which, being pivoted, as at $b^7$, imparts a corresponding backward and forward movement to the upper or short arm of the lever and thence to the arms $H^3$ $H^8$ and their corresponding arms, which, it will be seen, will operate the ratchet-wheel $H^2$ by means of the pawls $H^6$ $H^7$ engaging alternately with the ratchets, thus turning the wheels slightly by engagement of the pawl $H^7$ in the forward movement of the levers $H^3$ $H^8$, while the pawl $H^6$ slips over one or more of the ratchets and turns the wheel slightly and in the same direction by the engagement of the pawl $H^6$ in the backward movement of the said arms, while the pawl $H^7$ slips over one or more of the ratchet-teeth, the said pawls being held in position by means of suitable springs. The said rotary motion of the said ratchet-wheel imparts motion to the sprocket-wheels $f^{30}$ $f^{33}$, and thus to the sprocket-wheels $f^{31}$ $f^{32}$, by means of the sprocket-chain connection, which in turn conveys rotary motion to the roller $W^{26}$ upon which the wire fabric is rolled. It will be observed by reference to Fig. 2 that the roller $W^{26}$, or the wire fabric rolled thereon, bears upon the roller $W^{26}$, which said roller is journaled in the frame-piece $A^{53}$ on one side and in a corresponding frame-piece on the opposite side. It will also be observed by reference to Fig. 3 that the frame-piece $A^{25}$ is pivoted to the frame-piece $A^{53}$ at the point $b^{18}$ with the corresponding frame-piece on the opposite side pivoted in the same manner, and in these said frame-pieces $A^{25}$ the roller $W^{26}$ is journaled. The object of the said arms $A^{25}$ being so pivoted is to allow them to be borne upward by the gradual increase of the size of the roll of wire fabric and as the roll is increased in size and the frame-pieces $A^{25}$ are borne upward the length of the long arm $b^5$, pivoted thereto, is increased in the sense that it is drawn upward through the slot in the arm $H^{20}$, thus increasing the distance between its pivotal or fulcrum point attachment at $b^7$ and the lever $H^{20}$, so that as the arm $b^5$ of the lever is gradually lengthened a smaller degree of motion is given to the short arm of the said lever, and as a result the arms $H^3$ $H^8$, through the pawls $H^7$ $H^6$, transmit a correspondingly smaller degree of motion or rotation to the ratchet-wheel $H^2$ and to the sprocket-wheels $f^{30}$ $f^{33}$ and finally to the roller $W^{26}$, thus equalizing the rotation of the roller to accommodate itself to its increase in size, as it will be readily seen is necessary.

By reference to Fig. 10 it will be seen that the rim of the spool which is there shown bears upon the friction-block W. The object of the said friction-block is to produce a regular and steady tension upon the wire which is designed to be wound upon the said spool and drawn therefrom as the machine is in operation, there being the same tension when the spool is wound full as when it is nearly empty. This is evident, as the winding off of the wire from the spool bearing upon the friction-blocks acts on the principle of a lever, the varying arm of the lever being the radius of the spool, and when the spool is wound full, though the weight is greater upon the friction-blocks, it is equalized by the greater length of leverage, and when the spool is nearly empty, though its weight upon the friction-block is much less, yet it requires the same degree of tension or pull to turn the same, due to the shortness of the arm of the lever, thus giving a uniform tension regardless of the amount of wire upon the spools.

It will be seen that, as before described, the twist is designed to be made immediately in front of the castings *i i i*, &c., and at the point where the wires come out through the perforations in the said castings, and as the crossing wire is wound from the spool $a^4$ and passes through the perforation in the journal it is carried over one of the short levers or a hook thereon on the rods $j^4$ $j^5$ and is drawn outward by the action of the said levers in the operation of the machine, as hereinbefore described, providing sufficient space for the twist to be made, as shown in Fig. 14. The fingers *j* are designed to retain the mesh in proper form and are pivoted, as shown in the figure, so that the wire fabric can be drawn over them. The said fingers are returned to their normal position by the action of the springs $j^2$, there being similar springs attached to the several fingers.

If either one of the outside sectional twisters or spindles which carry the warp-wires or line-wires be considered in relation to the opposite outside sectional twister or spindle, as those at $i^5$ and $i^6$, it will be seen that the shifting section or twisting-shuttle which carries the weft-wire or filling-wire will be alternately shifted from conjunction or coincident relation with the journals of one of the spindles into conjunction with the other, the head-block or frame-piece $Q^2$ having, as aforesaid, the semicircular boxes adapted to hold the journals of the spindles in the manner described, so that the boxes for the journals of the twisting-shuttle can slide into coincident relation with the bearings for the spindles, the journals of the spindles and of the twisting-shuttle having flattened sides to permit the above results. This is illustrated in Fig. 17, in which the main parts of the fabric are shown as being the top and bottom strands, with the filling-wire or weft-wire going back and forth from one to the other.

If either of the outside spindles and the one next adjacent be considered, it will be seen that there is an alternate shifting of the twisting-shuttle from one to the other. This is illustrated in Fig. 18.

By examining Figs. 6 and 19 it will be seen that as a result of the construction and arrangement of parts herein provided the weft-wire is so united to the strand-wires that it may be regarded as consisting of a series of Z-shaped sections, one part of each Z being formed by the bends or coils of the mesh-wire (irrespective of any bend in the strand-wire) and the other part being the portions of the mesh-wire which extend toward the adjacent line-wires.

Having thus fully described our invention, what we claim, and desire to secure by Letters Patent, is—

1. In a wire-fabric machine, the combination with a series of sectional twisters for warp-wires, adapted to be intermittently rotated, each independent section of the series alternately in an opposite direction, and each having perforations in both journals of the respective sections for the passage through of wires, of a shifting section for the weft-wire adapted to have a lateral movement on its journals for successive matching relation with the journals of said series of sections, and having a perforation in one of its journals for the passage through of a wire, whereby when the said shifting section and any one of the series of sectional twister-journals are in conjunction and rotated together, the said wires will be twisted together, all substantially as described and shown.

2. In a wire-fabric machine, the combination with a series of sectional twisters for warp-wires adapted to be intermittently and successively rotated, each independent section of the series alternately in an opposite direction, each having its journals flattened on one side to form one half of the complete journal, and each having perforations in both half-journals of the respective sections for the passage through of wires, of a shifting section for the weft-wire having corresponding flattened journals to form the other half of the complete journal and a perforation in one of the said half-journals for the passage through of a wire, a shifting carriage having semicircular recess-bearings for the half-journals of said shifting section, and a stationary bearing-frame having semicircular recess-bearings for the half-journals of each of the series of stationary sections, and mechanism for reciprocating the shifting carriage to bring the journals of the shiftable section and of the stationary sections in coincidence successively for simultaneous rotation, both together to twist the wires together, all substantially as described and shown.

3. In a wire-fabric machine, the combination with a series of successively-rotating sections for the warp-wires, the rotation of each section being in an alternate direction in its successive rotation but in the same direction as the other sections of the series in their successive rotations, each having a semicircular depressed form between its half-journals and each having perforations in each of its respective half-journals, of a bifurcated section journaled above said series of sections and having a perforation in one of its half journals for passage through of a wire, and a spool mounted in said section for carrying the weft-wire, said journaled parts when in coincident relation constituting a twisting device, and actuating mechanism for shifting the shiftable carriage and section laterally to bring its half-journals in conjunction with the half-journals of each of the series of sections in succession and to rotate the said combined sections together and each independent section of the series alternately in opposite directions but always in the same direction as the alternate rotation of each of the respective sections of the series to twist the wires together, all substantially as described and shown.

4. In a wire-fence machine, the combination with a series of successively-rotating sections each having perforations in their half-journals for the warp-wires, the rotation of each independent section of the series being alternately in opposite direction but always in the same direction as the alternate rotation of each of the respective sections of the series, of a shiftable section having perforations in one of its half-journals for the weft-wire-actuating mechanism for shifting said shiftable section with a carriage in which it is carried to bring its half-journals in matching relation with the half-journals of the series of sections successively and to rotate said combined sections, the shiftable section with each one of the series successively to twist the wires together, a clamp formed of two sections arranged one above the other and designed to bear over and engage the wire fabric for the purpose of drawing backward the said fabric by the application of suitable power, and a fabric roll in advance of the clamp, all substantially as described and shown.

5. In a wire-fabric machine, the combination with a series of successively-rotating sections having perforations in their respective half-journals for the warp-wires, the rotation of each independent section of the series being alternately in opposite direction but always in the same direction as the alternate rotation of each of the respective sections of the series, a shiftable section having a perforation in one of its half-journals for the weft-wire, and actuating mechanism for shifting said shiftable section with a carriage in which it is carried to bring its half-journals in matching relation with the half-journals of the series of sections successively and to rotate said combined sections, the shiftable section with each one of the series successively to twist the wires together, of a clamp formed of two sections arranged one above the other and designed to bear over and engage the wire fabric for the purpose of drawing the same backward by the application of suitable power, a series of wide-faced wheels over which the warp-wires are carried situated in advance of the perforated half-journals of the series of sections for spacing the warp-wire, all substantially as described and shown.

6. In a wire-fabric machine, the combination with a series of successively-rotating sections having perforations in each of their respective half-journals, for the carrying through of the warp-wires, the rotation of each independent section of the series being alternate in opposite direction but always in the same direction as the alternate rotation of each of the respective sections of the series, a shiftable section having a perforation in one of its half-journals for the weft-wire and actuating mechanism for shifting said shiftable section with a carriage in which it is carried to bring its half-journals in matching relation with the half-journals of the series of sections successively and to rotate the said combined sections, the shiftable sections with each one of the series successively to twist the wires together, of a clamp formed of two sections arranged one above the other and designed to bear over and engage the wire fabric for the purpose of drawing the same backward by the application of suitable power, a series of wide-faced wheels over which the warp-wires are carried situated in advance of the perforated half-journals of the series of sections and provided to properly space the said warp-wires, and a take-up reel for operation in the way described, all substantially as described and shown.

7. In a wire-fence machine, the combination with a series of successively-rotating sections respectively having perforations in each of their half-journals for the carrying through of the warp-wires, the rotation of each independent section of the series being alternately in opposite direction but always in the same direction as the alternate rotation as each of the respective sections of the series, of the shiftable section having a perforation in one of its half-journals for the weft-wire, and actuating mechanism for shifting said shiftable section, with a carriage in which it is carried to bring its half-journals in matching relation with the half-journals of the series of sections successively and to rotate the said combined sections, the shiftable section with each one of the series successively to twist the wires together, of a clamp formed of two sections arranged one above the other and designed to bear over and engage the wire fabric for the purpose of drawing the same backward by the application of suitable power, a series of wide-faced wheels over which the warp-wires are carried situated in advance of the perforated half-journals of the series of sections and provided to properly space the said warp-wires, a take-up reel for operation in the way described, and a series of pivoted fingers arranged in pairs and adjusted immediately in front of the series of sections and in such position that the warp-wires are carried between the fingers of the respective pairs and are provided to engage with the wire meshes formed in the fabric to keep the same in proper form, the said fabric being enabled to be drawn over the said fingers when the wires are being drawn out, thus depressing the fingers which are returned to proper position by means of suitable springs provided for the purpose, all substantially as described and shown.

8. In a wire-fabric machine, the combination with the series of sections for carrying the warp-wires and a shiftable section for carrying the weft-wire, of the pinions on each of the series of sections, the same being segmentally toothed and the remainder of the surface thereof being depressed in circular form, and a segmentally-toothed cog-wheel a portion of its circumferential face being smooth and provided to engage said pinions successively, a sliding frame in which the shiftable section and suitable mechanism for shifting said carriage and shiftable section-frame one section of the series to the other in succession alternately traveling over every section of the series and returning, all substantially as described and shown.

9. In a wire-fence machine, the combination of the main frame, movable carriage, wire-twisting device comprising the series of twister-sections, and the shiftable section in the carriage, the shiftable section designed to intersect with each one of the series of sectional twisters in succession, the wire-spools mounted upon the main framework at the rear of the twister-sections, the frames, spools, and bar connections between the spool-frames and sprocket-wheels on the ends of side sectional twisters for carrying the wires designed to form the side cables of the fabric, mechanism for revolving the twisting device, mechanism for drawing strands of wire from the spools, mechanism for rolling up the wire fabric, and mechanism for moving the carriage, all substantially as described and set forth.

10. In a wire-fence machine, the combination of the main frame, of the bearing-frame formed with segmental openings, the series of twister-sections mounted therein, the movable carriage, the shiftable twister-section carrying the spool for the weft-wire moved by the carriage and designed to be carried over and to be revolved with each one of the series of twister-sections in succession to form the several twists, the spools, spool-frames, and bar connections with sprocket-wheels on the ends of side sectional twisters for carrying wires to be used in forming cable at the sides of the fabric, the intermediate spools mounted upon the main framework at the rear of the sectional twisters for carrying the remainder of the warp-wires, mechanism for drawing the wires from the spools, mechanism for operating the twister, mechanism for moving the carriage, and mechanism for rolling up the wire fabric, all substantially as described and set forth.

11. In a wire-fabric machine, the combination with the series of sections for carrying the warp-wires arranged in parallel relation having perforated journals connecting with a semicircularly-depressed central body, and stationary carrying-frame having semicircular bearings for said journals, of a shiftable section for carrying the weft-wire, a framework or movable carriage having semicircular bearings for the journals of said shiftable section adapted to move along upon the stationary carrying-frame to bring the shiftable section or the journals thereof successively in conjunction with the journals of the respective sections of the series, means for rotating the combined section, viz: the shiftable section with each one of the series successively in its movement back and forth with the sliding carriage as it traverses from one side to the other of the fabric in forming the twist, the said rotation of combined sections in the passage of the shiftable section with the carriage in one continued direction being the same and in the opposite movement of the shiftable section with the carriage, the direction of rotation is the same throughout, but the reverse of that in the opposite movement of the shiftable section and carriage, and means for shifting the said carriage and shiftable section in a step-by-step manner, all substantially as described and set forth.

12. In a wire-fabric machine, a twisting device for carrying the warp and the weft wires, consisting of a series of parallel adjusted and successively-rotative sections supplemented by a shiftable section rotative successively with each section of the series, a clamp formed of two sections adjusted one above the other to engage the wire fabric and to draw the same backward when suitable power is applied, a take-up reel for operation in manner described and mechanism for operating the combined sections to rotate them relatively in the same direction, consisting of a pinion on each section of the series segmentally cogged and having the uncogged portion depressed in circular form, a larger cog-wheel segmentally cogged, and the uncogged portion of its circumference provided with smooth face for an engagement with the circular depression in the segmentally-cogged pinion whereby each pinion is rotated a fixed portion of a revolution of said segmentally-cogged larger wheel and held non-rotative the remainder of each revolution, all substantially as described and shown.

13. In a wire-fence machine, the combination, with the main frame, of the carriage formed with the central oppositely and alternately rotatable shaft S′ journaled therein and bearing the disk-wheel G loose thereon, the sprocket-wheels $f^{45}$ $f^{30}$, the cog-wheel R, the shiftable hollow shafts $S^2$ and $S^{15}$ that bear the friction-clutches and the friction-clutch wheel $A^{12}$ keyed thereon; the oppositely alternately shiftable shaft $S^5$, having secured thereto the arms $S^9$, the sprocket-wheel $f^{46}$ loose thereon, and the pivoted arms $k^2$ $k^5$ that operate the friction-clutches; the rotatable shaft L bearing keyed thereon the partially-cogged wheel $L^{31}$, the cam $L^8$, and the disk-wheels $b$ and $b''$ carrying between them the small roller $b'$ and loose thereon the sprocket-wheel $f$; the plate $R^5$ carrying the adjustable finger-rods $j^4$ and $j^5$ connected with the disk-wheel $b$ and operated in connection therewith through the connecting-arm $l'''$ and the levers $l$, $l''''$, and $l''$; the shaft $G^5$ bearing the sprocket-wheel $f^{31}$, the cog-wheel $f'$, and the partially-cogged wheel $f^{32}$, that meshes successively with each one in succession of the partially-cogged wheels on the ends of the sectional twisters, the partially-cogged wheel T that meshes with the partially-cogged wheel $L^{31}$ to give an intermittent motion; the twister-section $k$ formed with half-journals and carrying spool $d^4$; suitable mechanism for moving the carriage back and forth upon and across the main frame upon suitable bearings, and suitable mechanism for operating the working parts of the carriage, all substantially as described and set forth.

14. In a wire-fence machine, the combination with the main frame, of a wire-reel formed of the roller $w^{26}$ bearing upon the roller $W^3$ and journaled in the pivoted frame-pieces $A^{25}$, the ratchet-wheel $H^2$ fixed upon the shaft $S^{12}$ and turned by means of the pawls $H^7$ and $H^8$ actuated through the movement of the pivoted arms $H^{10}$ and $H^3$ imparted thereto by the back-and-forth movement of the depending pivoted arm $b^5$; a suitable sprocket-wheel and sprocket-chain connection between the roller-shaft and the ratchet-wheel shaft, and suitable means for imparting the back-and-forth movement to the arm $b^5$, all substantially as and for the purpose set forth.

15. In a wire-fabric machine, the combination with the series of spools $d^{10}$, $d^{10}$, &c., having the rims as shown and designed to be filled with wire, of the friction-blocks W, depressed circularly to fit the rims on the said spools $d^{10}$, and said spools being held in suitable standards to prevent side motion, the combined structure being formed to provide and produce a regular and unvarying tension upon the wire on said spools while the same is being wound thereon, all as particularly described and shown.

16. In a wire-fence machine, the combination therewith of a wire-reel formed of the roller journaled in arms pivoted to permit its being raised or lowered and bearing upon another roller suitably journaled, the ratchet-wheel keyed upon the shaft connected by suitable means with the reel-roller shaft, the combination of pivoted arms journaled upon the same shaft with the ratchet-wheel and bearing at their middle pivoted joints the oppositely-actuating pawls, and all the arms pivoted together at their rear extremities to a depending bar, the depending bar pivoted at a point between its extremities and depending downward through the slot in the adjustable arm below, and suitable mechanism for operating the depending pivoted lever for the purpose of imparting motion to the respective parts to turn the reel, all substantially as described and shown.

17. In a wire-fence machine, a twisting mechanism composed of a series of warp-wire-carrying sections successively rotated each in the same direction and having a fixed relation to the stationary carrying-frame and a shiftable section designed to be successively matched and rotated with each of the respective sections of the series and rotated with said sections to twist the wires together and a series of pivoted fingers arranged in pairs immediately in front of the respective sections of the series to hold the wires in alinement and to hold the mesh of the fabric in form while the twist is being made and a clamp designed to engage the wire fabric and by application of suitable power to draw the same backward to draw out the wires from off the spools and through the respective sections of the series, all substantially as described and shown.

18. In a wire-fence machine, the combination therewith of the clamp $A^{72}$ designed to be secured to the wire fabric at the forward part of the machine and having connected therewith the sprocket-chains M′ and M″ carried upon suitable sprocket-wheels at the forward and rear ends of the machine, provided for the purpose of drawing out the wires from off the spools; the roller $W^{26}$ journaled in the pivoted frame-pieces $A^{25}$ and carried upon the roller $W^3$, the ratchet-wheel $H^2$ fixed upon the shaft $S^{12}$ and turned by means of the pawls $H^7$ and $H^8$ actuated through the movement of the pivoted arms $H^{10}$ and $H^3$ imparted thereto by the back-and-forth movement of the depending pivoted arm $b^5$, a suitable sprocket-wheel and sprocket-chain connection between the roller-shaft and the ratchet-wheel shaft, suitable mechanism for moving the clamp $A^{72}$ for the purpose of drawing out the wires, and suitable mechanism for imparting a back-and-forth movement to the arm $b^5$ for the purpose of operating the wire-reel for rolling up the wire upon the roller $W^{26}$ as the wire fabric is drawn backward by the clamp $A^{72}$, all substantially as described and set forth.

19. In a wire-fabric machine, the combination with a series of warp-wire-carrying sections constructed to be successively rotated, each in constant direction, and having a fixed relation to the stationary frame, and a shiftable section for carrying the weft-wire, constructed and arranged to be successively moved or shifted and matched and rotated by and with the independent sections of the series successively for the purpose of twisting wires together, of a series of pivoted fingers arranged in pairs immediately in front of the respective sections of the series to hold the warp-wires in alinement and to hold the mesh of the fabric in form while the twist is being made, the clamp formed of two sections designed to engage the wire fabric and by the application of suitable power to draw the same backward to draw out the wire from off the spools and through the respective sections of the series, a series of wide-faced wheels adjusted at intervals apart for carrying the wire fabric and to assist the turning of its direction of movement, and a take-up reel for operation in the way described, all substantially as described and shown.

20. In a wire-fabric machine, the combination of a series of parallel adjusted sections for warp-wires, having a fixed relation to the frame, each having a wire-delivery passage in each of its respective half-journals and a broken or segmental pinion on one end of each of the respective sections, with a shiftable section for the weft-wire, shiffable laterally successively from section to section in a step-by-step motion in a plane above said series of sections, a gear-connected shaft carried in the same carriage or shiftable frame with the shiftable section and having a segmental gear-wheel adjusted to engage successively with each section-pinion to effect the rotation of said combined sections, the said shifting section successively with each section of the series, each section in the same direction according to the direction of the lateral movement of the shifting section, mechanism for shifting the said shiftable section and frame, also suitable mechanism for rotating the sections when in conjunction to form the several successive twists, and means for drawing out the wires, all substantially as described and set forth.

21. In a wire-fence machine, a series of laterally-stationary twister-sections and a shifting section to impinge upon the former in succession when they aline therewith and be rotated therewith, in combination with the spools supplying line-wires to the stationary wister-sections, each one of the series of twister-sections being provided with an eccentric opening for the passage therethrough of the warp-wire, and the shifting section carrying a spool for the weft-wire, the forward end of the shifting section being provided with an eccentric opening for the passage therethrough of the weft-wire as it is wound from the spool, all substantially as described and set forth.

22. In a wire-fabric machine, the combination of a carrying-frame, the sliding frame or carriage thereon, the sectional twisters each consisting of a deflected central body and segmentally-formed journals, and a single shifting section formed to carry a spool at its middle portion and having segmentally-formed journals at either end thereof, the lower sections being carried in a stationary frame and the shifting section in the sliding frame, and means for moving the sliding frame with a step-by-step motion, to cause the shifting section to bear over each one of the series of lower sections in succession to complete full journals and to be rotated to form the twist, all substantially as described and set forth.

23. In a wire-fabric machine, a two-part twister, consisting of a lower section having a front segmental half-journal, a bowed or depressed middle portion, a segmental rear journal, and an integral power-wheel, there being a wire-guide around the bowed or depressed part for retarding the wire and an eccentric wire-orifice in the front journal, in combination with a separable upper section having a front segmental journal, a rear segmental journal, and a bowed or deflected spool-support between the journals arranged to hold the spool in or near the axis of rotation, the segmental journals of the said two sections forming complete circles when they are placed together one upon the other, substantially as described.

24. In a wire-fence machine, the combination with a series of twister-sections, of a shiftable section designed to be turned with each one of the twister-sections in succession to twist together wires carried in the respective sections, all substantially as and for the purpose set forth.

25. In a wire-fence machine, the combination with a series of twister-sections with perforated half-journals and depressed at their central portions into partial circles, of a shiftable section formed with perforated half-journals and expanded at its central portion to carry a spool and being designed to be rotated with each one of the twister-sections in succession to twist together wires carried in the said sections, all substantially as described and for the purposes set forth.

26. In a wire-fence machine, the combination therewith, of a wire-twister formed of two sections, each provided with segmental half-journals, and with the respective half-journals of one section perforated to bear wires therethrough, and one of the half-journals of the other section perforated to bear wire therethrough, and the said other section expanded to carry a spool for wire, one section being stationary and one shiftable, but combined to form the twister, all substantially as described and shown.

27. In a machine for forming wire fencing, the combination with the spindles $i^5$ and $i^6$ for carrying line-wires arranged in parallel relation, having axially-bored journals connecting bowed grooved parts, and head-blocks having semicircular bearings for said journals, of a twisting-shuttle for carrying the filling-wire, boxes having semicircular bearings for the journals of said twisting-shuttle and adapted to slide over in coincident relation to the semicircular bearings for the spindle-journals, the said journals of the spindles $i^5$ and $i^6$ and of the twisting-shuttle having coincident flattened sides, means for alternately rotating said spindles, and means for alternately shifting said twister-shuttle in coincident relation to said spindle-journals for rotation therewith, substantially as described.

28. In a machine for forming wire fencing, the combination with the spindles $i^5$ and $i^6$ adjacent to each other for carrying line-wires arranged in parallel relation, having axially-bored journals connecting bowed grooved parts, and head-blocks having semicircular bearings for said journals, of a twisting-shuttle for carrying the filling-wire, boxes having semicircular bearings for the journals of said twisting-shuttle and adapted to slide over in coincident relation to the semicircular bearings for the spindle-journals, the said journals of the spindles and of the twisting-shuttle having coincident flattened sides, means for alternately rotating said spindles, and means for alternately shifting said twisting-shuttle in coincident relation to said spindle-journals for rotation therewith, substantially as set forth.

29. In a machine for forming wire fencing, the combination with the spindles for carrying the line-wires arranged in parallel relation, having axially-bored journals connected by bowed grooved parts, and head-blocks having semicircular bearings for said journals, of a twisting-shuttle for carrying a filling-wire, boxes having semicircular bearings for the journals of said twisting-shuttle adapted to slide over in coincident relation to the semicircular bearings for the spindle-journals, the said journals of the spindles and of the twisting-shuttle having coincident flattened sides, means for shifting said twisting-shuttle into coincident relation to the journals of one of said spindles for rotation therewith and then into similar relation with the journals of the adjacent spindle, substantially as described.

30. In a wire-fence machine, the combination with a series of three or more parallel spindle or twister sections for the line or warp wires, a laterally-shifting shuttle or twisting-section adapted to travel from the first spindle to the second and then the third and so on throughout the series before returning to the first and to rotate with the said spindles successively, and then travel in the opposite direction toward the first rotating with all of the three or more spindles successively in inverse order during the return travel, substantially as set forth.

31. In a wire-fence machine, the combination of two or more non-sliding or laterally-stationary twisters or spindles, each having a line-wire passing therethrough, a series of line-wire spools in the rear of the spindles respectively, and a sliding or shifting shuttle or twisting-section adapted to rotate with the said spindles successively and to move bodily intermittingly over the entire distance between the axis of one spindle and the next, and means for automatically advancing the woven fabric away from the machine after each traverse of the shuttle, substantially as set forth.

32. In a wire-fence machine, the combination of two or more non-sliding or laterally-stationary spindles or twister-sections, each provided with a stationary line-wire passage at the delivery end whereby the line-wires of the fence are substantially straight but can be twisted around the weft-wire, a stationary spool for supplying wire to each of said spindles, a laterally-shifting shuttle or twisting-section adapted to be moved bodily laterally intermittingly over the entire distance between the axis of one spindle and the axis of the next and to rotate with the said spindles successively, said shuttle having a weft-wire passage at its delivery end, substantially as set forth.

33. In a machine for weaving wire fabric, the combination with a transversely-movable shuttle or weft-wire carrier having a perforated wire-delivery journal, and a wire-holder or spool immediately behind said delivery-journal, and mounted on an axis transverse to the line of the wire-delivering passage and in the plane thereof, and means for moving said journal and wire holder into different parallel positions in a common plane, substantially as set forth.

34. In a machine for weaving wire fabric, the combination of a series of two or more non-sliding or laterally-stationary line-wire spindles, each having an eccentric delivery-journal and a wire-guide bent or deflected from the line of said journal, and a transversely-movable shuttle having a delivery-journal adapted to coincide with said spindle-journal and having a wire-spool in the vertical plane of the said deflected wire-guides of the spindle, substantially as set forth.

35. In a machine for weaving wire fabric, the combination of the non-sliding or laterally-stationary line-wire spindles, each having two journals, the journals of all the spindles being on two transverse lines, and the front journals having eccentric wire-passages, the shuttle or weft-wire carrier having a delivery-journal and a wire-spool, and means for moving said shuttle transversely to bring its said delivery-journal into conjunction with the front journals successively of the line-spindles, substantially as set forth.

36. In a machine for weaving wire fabric, a transversely-movable rotary shuttle or wire-carrier having journals and an intermediate arm deflected or bent from the line of the journals, in combination with a spool having its axis substantially in the plane of the axis of rotation of the shuttle, and transverse thereto whereby a supply of wire may be held on said axis, substantially as set forth.

37. In a machine for weaving wire fabric, a shuttle or weft-wire carrier having a front and a rear sliding journal and between them a laterally-expanded frame, in combination with a spool mounted in said frame on an axis transverse to the axis of the shuttle and holding a supply of wire on the last said axis, substantially as set forth.

38. In a machine for weaving wire fabric, a series of two or more line-wire carriers each having front and rear journals with a single intermediate wire-guiding arm deflected or curved away from the line of the journals, and having a continuous wire-passage through the said journals and along the said deflected arm, in combination with a wire-carrier adapted to move transversely of the said curved arm through the space at their axes, substantially as set forth.

39. In a machine for weaving wire fabric, the combination with a series of two or more line-wire carriers or twister-sections, each having two journals and an intermediate deflected or curved arm with a wire-passage through said journals and along said arm, means behind the rear journals for supplying line-wires, and a shuttle or wire-carrier having a weft-wire spool arranged to travel laterally in front of the said rear journals, substantially as set forth.

40. The combination of the line-wire spindles, each having two flattened journals and an intermediate deflected or bowed wire-guide with a continuous wire-passage, and a weft-wire carrier having two flattened journals adapted to coincide with the spindle-journals, and having a wire-spool adapted to lie in the vertical lines of the bowed arm of each spindle, and mounted transversely to the axis of rotation of the spindle substantially as set forth.

41. In a wire-fencing machine, the combination of two outside spindles or twister-sections, each adapted to have two wires continuously passing therethrough or lying therein, one or more intermediate spindles or sectional twisters for line-wires, each having a single wire-passage adapted to receive a single line-wire, and a shifting section or shuttle adapted to move from one to another of the entire series of outside and intermediate spindles and rotate therewith successively, traveling alternately in both directions across said series, substantially as set forth.

42. In a machine for manufacturing fabric with one or more doubled or cable-like line-wires, the combination of a series of two or more line-wire-twister sections, each having two perforated journals and an intermediate deflected wire-guide, of which twister-sections one or more is provided behind the rear journal with a rotary wire-carrier, of a transversely-movable rotary shuttle or weft-wire carrier, having the spool in the vertical lines of the said deflected wire-guides of the twister-sections, substantially as set forth.

43. The combination of two outside and one or more intermediate line-wire spindles, all stationary transversely, with line-wire passages at their delivery ends, and the transversely-moving weft-wire shuttle registering first with an outside line-spindle, then with all the intermediate line-spindles, and then with the other outside spindle, means for intermittently revolving the shuttle around each line-wire, means for intermittently moving the shuttle transversely from each outside line-wire to each intermediate line-wire and then to the other outside wire and a wire-spool carried by the shuttle, substantially as set forth, whereby substantially Z-shaped bends will be imparted to the weft-wire at the joints with the intermediate line-wires.

In testimony whereof we affix our signatures in presence of two witnesses.

PETER SOMMER.
JOHN SOMMER.
PETER W. SOMMER.

Witnesses:
J. M. SAWYER.
B. ZIEGLER.